(12) United States Patent
Asmundsson et al.

(10) Patent No.: US 9,009,199 B2
(45) Date of Patent: Apr. 14, 2015

(54) DATA MINING USING AN INDEX TREE CREATED BY RECURSIVE PROJECTION OF DATA POINTS ON RANDOM LINES

(75) Inventors: Fridrik Heidar Asmundsson, Mosfellsbaer (IS); Herwig Lejsek, Scheibbs (AT); Bjorn Thor Jonsson, Reykjavik (IS); Laurent Amsaleg, Guichen (FR)

(73) Assignee: Haskolinn I Reykjavik, Reykjavek (IS)

( * ) Notice: Subject to any disclaimer, the term of this patent is extended or adjusted under 35 U.S.C. 154(b) by 1162 days.

(21) Appl. No.: 12/303,598

(22) PCT Filed: Jun. 6, 2007

(86) PCT No.: PCT/IS2007/000014
§ 371 (c)(1),
(2), (4) Date: Apr. 3, 2009

(87) PCT Pub. No.: WO2007/141809
PCT Pub. Date: Dec. 13, 2007

(65) Prior Publication Data
US 2010/0174714 A1    Jul. 8, 2010

(30) Foreign Application Priority Data
Jun. 6, 2006   (IS) .............................................. 8499

(51) Int. Cl.
*G06F 17/30* (2006.01)
(52) U.S. Cl.
CPC ................................ *G06F 17/30327* (2013.01)
(58) Field of Classification Search
CPC .................................................. G06F 17/30327
USPC .......................................................... 707/797
See application file for complete search history.

(56) References Cited

U.S. PATENT DOCUMENTS

| | | | |
|---|---|---|---|
| 7,610,269 B1 * | 10/2009 | Gupta et al. | 1/1 |
| 2002/0123987 A1 * | 9/2002 | Cox | 707/3 |
| 2002/0188613 A1 * | 12/2002 | Chakraborty et al. | 707/100 |
| 2003/0195890 A1 * | 10/2003 | Oommen | 707/100 |
| 2007/0250476 A1 * | 10/2007 | Krasnik | 707/2 |
| 2009/0171954 A1 * | 7/2009 | Liu et al. | 707/6 |
| 2009/0210413 A1 * | 8/2009 | Hayashi et al. | 707/5 |
| 2011/0022638 A1 * | 1/2011 | Jiang | 707/797 |
| 2012/0030235 A1 * | 2/2012 | Lin et al. | 707/769 |

OTHER PUBLICATIONS

Bykowski, Arthur, International Search Report for PCT/IS2007/000014, Aug. 22, 2007, European Patent Office.*
V Ramasubramanian and KK Paliwal, Fast k-dimensional tree algorithms for nearest neighbor search with application to vector quantization encoding, IEEE, 1992.*

(Continued)

*Primary Examiner* — James Trujillo
*Assistant Examiner* — Kurt Mueller
(74) *Attorney, Agent, or Firm* — Muncy, Geissler, Olds & Lowe, P.C.

(57) ABSTRACT

The present invention relates to a method computer program product for datamining with constant search time, the method and computer program product comprises the steps of: traversing a search tree to a leave, retrieving a one or more data store identifier from said leave, read data pointed to by said data store identifier, locating one or more value in said data, referencing one or more data descriptor, retrieve the n-nearest data descriptor neighbors, terminate said search.

7 Claims, 6 Drawing Sheets

(56) References Cited

OTHER PUBLICATIONS

H Lejsek, A case-study of scoring schemes for the pvs-index, ACM, 2005.*

Herwig Lejsek et al., "Efficient and Effective Image Copyright Enforcement," Proc. of the BDA, 2005, (online) url:http://www.irisa.fr/texmex/people/amsaleg/amsaleg.pdf.

Anonymous, "B-Tree" Wikipedia-Internet Article,retrieved on Aug. 21, 2007, (online) url:http://en.wikipedia.org/wiki/B-tree.

* cited by examiner

US 9,009,199 B2

DATA MINING USING AN INDEX TREE CREATED BY RECURSIVE PROJECTION OF DATA POINTS ON RANDOM LINES

TECHNICAL FIELD

This invention relates to efficiently performing an approximate indexing and similarity search in large collections of high-dimensional data signatures.

BACKGROUND ART

While there are many prior proposals for indexing high-dimensional data (for a survey, see H. Samet, *Foundations of Multidimensional and Metric Data Structures*, Morgan Kaufmann, 2006), they have all been shown to suffer from the so-called dimensionality curse (see R. Bellmann: *Adaptive Control Processes: A Guided Tour.* Princeton Univ. Press (1961)), which means that when the dimensionality of the data goes beyond a certain limit, all search and indexing methods aiming exact answers to the problem have shown to perform slower than a sequential scan of the data signature collection. As a result none of these approaches has been shown to be applicable to large data signature sets.

One paradigm for attacking the dimensionality curse problem is to project high-dimensional data signatures to random lines, which was introduced by Kleinberg (see *Two Algorithms for Nearest-Neighbor Search in High Dimensions*, Jon M. Kleinberg, 1997) and subsequently used in many other high-dimensional indexing techniques. Such projections have two main benefits. First, in some cases, they can alleviate data distribution problems. Second, they allow for a clever dimensionality reduction, by projecting to fewer lines than there are dimensions in the data.

Fagin et. al. presented in their paper, "*Efficient similarity search and classification via rank aggregation (Proceedings of the ACM SIGMOD*, San Diego, Calif., 2003)" an algorithm called (O)MEDRANK for projecting the data signatures to a single random line per index and storing the identifiers organized in a B+-tree on a data store. This algorithm is described in the US 20040249831 patent application.

Since the OMEDRANK algorithm needs B+-trees for its query retrieval, Lejsek et. al in their paper, "*A case-study of scoring schemes for the PvS-index*", in the proceedings of *CVDB*, Baltimore, Md., 2005 proposed an enhanced version of the OMEDRANK algorithm called the PvS-index, which redundantly saves these B+-trees to disk for fast lookup. The PvS-index suffers, however, from its static nature, which does not support updates as soon as nodes need to be split. Further drawbacks are the limited number of random lines (one line per hierarchy), the insufficient disk storage by using multiple B+-trees and its tight tie to the OMEDRANK algorithm and the Euclidean distance.

Another strategy in high-dimensional indexing follows the idea of Locality Sensitive Hashing (LSH), published by Indyk et al. in "*Similarity search in high dimensions via hashing*", in the *Proceedings of VLDB*, Edinburgh, 1999 and "*Locality-sensitive hashing using stable distributions*", MIT Press, 2006. LSH is not based on a sorted tree structure, but on hashing the data signatures into buckets. The hash function is constructed by projecting each data signature onto a small set of random lines with fixed cardinality. Each of the projections is categorized into buckets and each of these buckets is assigned an identifier. By concatenating all the identifiers of the projections a hash value is constructed and all data signatures resulting the same hash value are stored together on the data store.

Joly et. al have shown in "*Content-Based Copy Detection using Distortion-Based Probabilistic Similarity Search*" in *IEEE Transactions on Multimedia*, 2007 a video-retrieval system based on Hilbert-Space-Filling-Curves for fast high-dimensional retrieval. This method has, however, tuned especially for this specific and rather low-dimensional application, which still needs a sequential scan at the end of the query processing.

DISCLOSURE OF THE INVENTION

The present invention, in the present context called the NV-tree (Nearest Vector tree) is a data structure designed to provide efficient approximate nearest neighbor search in very large high-dimensional collections. Specifically, the indexing technique is based on a combination of projections to lines through the high-dimensional space and repeated segmentation of those lines. The resulting index structure is stored on a data store in a manner which allows for extremely efficient search, requiring only one data store access per query data signature.

In essence, it transforms costly nearest neighbor searches in the high-dimensional space into efficient uni-dimensional accesses using a combination of projections of data signatures to lines and partitioning of the projected space.

By repeating the process of projecting and partitioning, data is eventually separated into small partitions or "clusters" which can be easily fetched from the data store with a single data read operation, and which are highly likely to contain all the close neighbors in the collection. In a very high-dimensional space, such "clusters" may overlap. The present invention is in contrast to the prior art of the PvS index capable of handling any distance metric, as long as the projection preserves some distance information. Therefore, the drawback of Euclidean distance being the only distance measure is eliminated. Furthermore, the present invention provides methods for searching data of any size in a constant time. Moreover, in the prior art, the search quality of the PvS-index was highly dependent on the random line generated at the beginning of the index creation. The NV-tree greatly improves the search quality by selecting the best line, given a set of data signatures. In the present context the best line is the line which has the largest projection variance.

Also, while the PvS-index needs to sort the projected values after each partitioning step, the NV-tree only sorts the projected values when they are written to the data file, making the creation process considerably more efficient than the PvS-index.

In addition, since the PvS-index had to use many B+-trees, an inefficient disk-storage structure was created which led to a significant enlargement of the index and a significant startup cost. In fact the NV-tree can store just the data signature identifiers, and optionally, the location information on the line for every n-th point, which results in a very compact data structure. Furthermore, the NV-Tree supports also non-overlapping partitioning while the PvS-Index strictly requires such overlaps between the borders of partitions.

While the PvS-index is built on top of the OMEDRANK algorithm, the NV-tree is a general indexing technique for high-dimensional nearest neighbor queries. Since the PvS-index stores only the B+-trees needed for the OMEDRANK in its index, it is not a general data structure.

Compared to prior art on Locality Sensitive Hashing (LSH), the NV-tree is a tree structure while LSH is a flat hash based structure. LSH projects the data signatures onto a set of random lines and segments each individual line in equal-length buckets. In contrast to the NV-Tree, all projection steps are performed right at the start of the creation/search/update procedure, similar as in the PvS-Index.

Since LSH is an ϵ-Approximate Nearest Neighbor Search, the width of those buckets (also referred to as radius) is dependent on the chosen ϵ-threshold. The data signature is then assigned an identifier for each line according to the bucket it had been projected to. In a next step these identifiers are concatenated to a hash keyword (with the word's size equivalent to the number of lines), which identifies the cluster on the data store where a point is stored.

While the NV-Tree always guarantees constant access time to the data store, LSH suffers from the unpredictability of its hash bucket sizes. Individual Hash buckets may be empty or may contain many thousands of data signatures, which often exceeds the capacity of a single data store access. Furthermore, LSH suffers from non-existing rankings inside its hash buckets. Therefore its authors suggest loading all actual data signatures referenced in a hash bucket from the data store and calculating the actual distances between them and the query point. For large collections, this leads to additional O (bucket size) random accesses to the data store. In contrast, the NV-Tree does not need to calculate the distances as it is a purely a rank based solution.

The size of an entry in an LSH hash table on the data store consists of at least one identifier and a control hash value per data signature, while the NV-Tree stores just the sorted identifiers inside a leaf node. In order to lookup those identifiers we insert a key value for every $8^{th}$-$64^{th}$ identifier in the leaf node. This enables a leaf node to store up to 100% more identifiers. A non-overlapping NV-Tree needs therefore just about half the space on a data store than a LSH hash table, while an overlapping NV-Tree provides significantly better accuracy of the results, but requires a multiple of that space because its storage requirement is inherently exponential.

In a first aspect the present invention relates to a method for creating a search tree for data mining with constant search time. The method comprising the steps of: generating a set of isotropic random lines and store said lines in a line pool, projecting all the data signatures onto a projection line from said pool, building a tree node storing information characterizing said line, segment said line into two or more line partitions, segment further said two or more line partitions. The first steps of the method are repeated for each partition until a stop value is reached and then data signatures of current partition are projected to a line. Thereafter the data signatures are sorted and stored.

In another aspect the present invention relates to a method for inserting data signatures into a search tree. The method comprising the steps of: traversing said search tree, projecting data signatures representing said data to be inserted onto a projection line and selecting one or more path based on a projection value obtained projection step. The first three steps are repeated until said data signature is projected to a value belonging to a partition stored in said data store. The next step involves searching for location in pre-sorted data signatures of said partition and finally the data signature is stored.

In another aspect the present invention relates to a method for storing data from a search tree. The method comprising the steps of: selecting a projection line, projecting data signatures representing the data to be searched for onto the projection line and building a tree node storing information characterizing the partition and the line, segment the line into two or more partitions. Next the partitions are segmented and previous steps for each partition are repeated until a stop value is reached. Then data signatures of current partition are projected to a line, data signatures are sorted and finally, the data signatures are stored.

In another aspect the present invention relates to a method for deleting data signature from a search tree. The method comprising the steps of: traversing said search tree, projecting data signatures and representing said data signatures to be deleted, onto a projection line. Next, one or more path is selected based on a projection value obtained in the second step of the method and the first steps are repeated until said data signature is projected to a value belonging to a partition stored in said data store. Then appropriate location among pre-sorted data signatures is located in said partition and the data signature is deleted.

In another aspect the present invention relates to a method for data mining a search tree with constant search time. The method comprising the steps of: traversing a search tree to a leave, retrieving one or more data signature from said leave and reading data pointed to by said data signature. Next one or more value is/are located in said data, one or more data signatures is referenced and the n-nearest data signatures neighbors are retrieved. Finally the search is terminated.

In another aspect the present invention relates to a computer program or suite of computer programs is provided, so arranged such that when executed on a processor said program of suite of programs cause(s) said processor to perform the methods of the present invention. Furthermore a computer readable data storage medium is provided for storing the computer program or at least one of the suite of computer programs of claim mentioned above.

DETAILED DESCRIPTION

Figure 1:
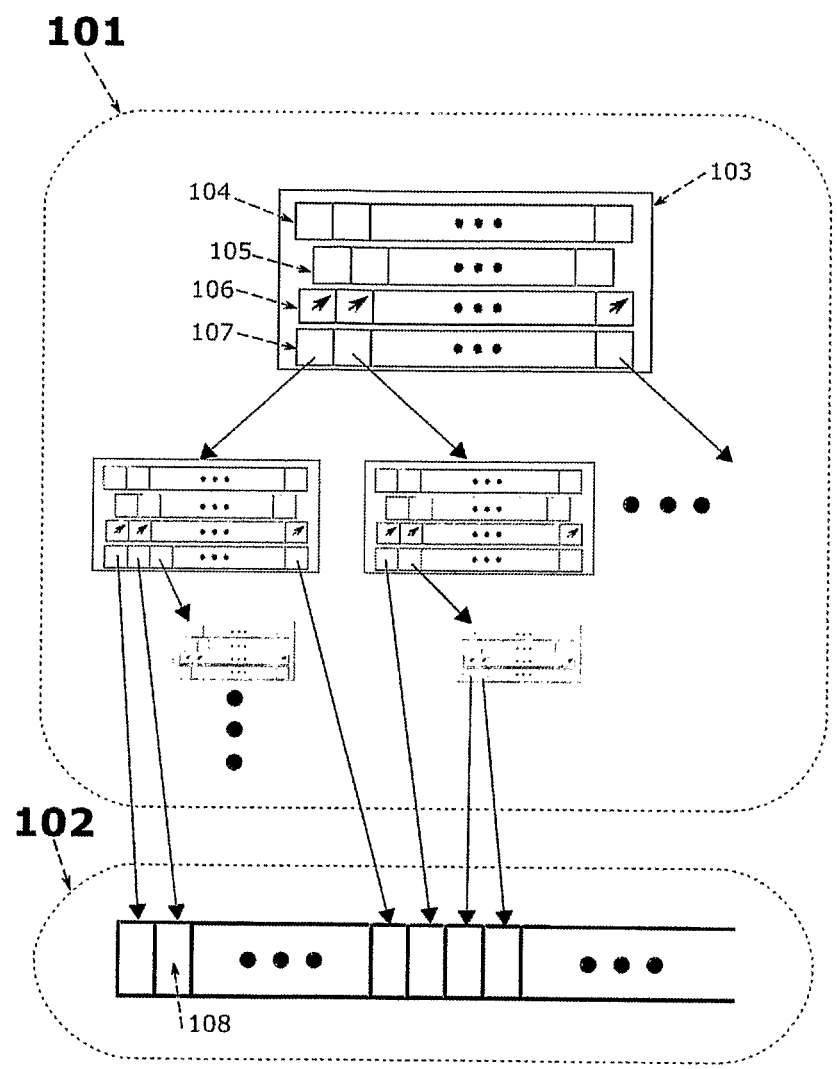
FIG. 1. shows the NV-Tree data-structure and its data store

In the following section the NV data structure, tree creation, insertion, deletion and search is described in a detail. In order to clarify the technical jargon commonly used in the field of the invention a definition of terms is provided.

Definitions Of Terms Used In The Present Context

Constant Time:

Refers to the time required to retrieve the same amount of data from a data store. Data stores in computers are hierarchically organized (Register-L1 cache-L2 cache-Lcache-main memory-secondary storage) and one access to such a data store takes a specified constant amount of time and retrieves a constant amount of locality close data (bandwidth).

Constant time access to a secondary data store may (in case of a hard disk or an optical disk) have slightly different access time depending on where the data is located, still it is regarded as constant access time in the present context.

NV-Tree:

NV-tree refers to the nearest vector tree data structure used in the implementation of the present invention.

NV-Tree Leaf Node:

An NV-Tree leaf node refers to an array of data signature identifiers stored on a data store in a way
  that the whole leaf node can be fetched within a single access to the data store
  that given a query point q and a line l there exists a way to retrieve a ranking of the identifiers stored in the leaf node.

In order to position the cursor for the rank aggregation more accurately a leaf node may furthermore contain key values associated with every data signature, or just a small fraction of the data signatures.

For data stores with high bandwidth a leaf node might also contain further projection and partitioning steps in order to achieve smaller result sets with stronger rankings.

Load Factor:

The Load Factor of an NV-Tree leaf node is defined by the number of actual entries in the leaf node divided through the number of possible entries that fit in an NV-Tree leaf node. For a good insertion performance it is recommended that the leaf nodes are not fully loaded during the creation step.

Minimum Load Factor:

Unlike Local Sensitive Hashing which allows empty buckets, NV-Tree leaf nodes must contain a minimum number of entries (filling ratio).

Data Signature:

Refers to the data descriptor describing the data to be searched for in the data mine.

Data Signature Identifier:

Refers to an index number which clearly identifies a single data signature. Inside the NV-Tree leaf nodes are typically only those identifiers stores, since the actual signature data is not needed for the retrieval. This makes data store requirements of the NV-Tree independent from the actual dimensionality of the data signatures.

Data Mine:

Database of any size.

Data Store:

Refers to any primary (RAM) or secondary memory such as hard drives, tapes, optical disks, flash-memory drives and any other secondary storage media used in the computer industry.

$L_p$ Distance:

For a point $(x_1, x_2, \ldots, x_n)$ and a point $(y_1, y_2, \ldots, y_n)$, the Minkowski distance of order p (p-norm distance) is defined as:

$$p\text{-}norm\ distance = \left(\sum_{i=1}^{n} |x_i - y_i|^p\right)^{1/p}$$

Projection:

A projection f: Sn×Sn-->R refers to a function that transforms an n-dimensional vector into a real number. Sn refers thereby to any n-dimensional set a metric d: Sn×Sn-->R is defined and where R specifies the set of real numbers.

Additionally f has to preserve some distance information according to the metric d, so that $d(x,y) >= |f(x,z)-f(y,z)|$, where x, y, z $\in S^n$.

Examples for such projections are:
  all distance functions by themselves, as all metrics must fulfill the triangle inequality
  inner products (if available), as they fulfill the cauchy-schwarz-bunjakowsky inequality.

Projection Line:

A projection line is a n-dimensional vector $l \in S^n$. This vector is always used as the second parameter in a projection f: $S^n \times l$ -->R.

General (k-) Nearest Neighbor Search:

Nearest Neighbor Search (NNS), also known as proximity search or closest point search, is a numerical optimization problem for finding closest points in multidimensional metric spaces. The problem is: given a set S of points in d-dimensional space V and a query point $q \in V$, find the closest point in S to q as defined by the distance in the metric space. When talking about k-nearest neighbors we refer to the k closest points to a query Point q. A metric space is a set where a notion of distance between elements of the set is defined.

ε-Approximate Nearest Neighbor Search:

ε-Approximate Nearest Neighbor Search is an approximation to the general nearest neighbor search problem. The problem is: given a set S of points in d-dimensional space V and a query point $q \in V$, find all the points in S for which the distance to q is smaller than a fixed ε.

Contrast filtered Nearest Neighbor Search:

Contrast Filtered Nearest Neighbor Search is another approximation to the general nearest neighbour search problem. The problem is: given a set S of points in d-dimensional space V and a query point $q \in V$, return a very small or even empty set of points in S for which the distance to q is at least a factor c, with c>1, smaller than almost all other points in S.

SIFT:

Scale-invariant feature transform (or SIFT) is a computer vision algorithm for extracting distinctive features from images, to be used in algorithms for tasks like matching different views of an object or scene (e.g. for stereo vision) and object recognition. This algorithm is described in the U.S. Pat. No. 6,711,293 patent application.

Search Quality:

There are two metrics which describe the performance of an information retrieval system.
  Recall: The proportion of relevant data signatures retrieved out of all relevant data signatures available
  Precision: The proportion of relevant data signatures retrieved to all the signatures retrieved NV-Tree Creation First, a large set of isotropic random lines is generated and kept in a line pool. When the construction of an NV-tree index starts, all data signatures are considered to be part of a single temporary partition. Data signatures belonging to the partition are first projected onto a single projection line through the high-dimensional space. For best retrieval quality the line with the largest projection variance is chosen from the line pool.

The projected values are then partitioned into disjoint sub-partitions based on their position on the projection line. In case of overlapping NV-Trees, sub-partitions are created for redundant coverage of partition borders. These overlapping partitions may cover just a small part exactly around the partition borders or may grow to fully adjoining overlapping partitions. Strategies for partitioning are described in detail later in the text.

This process of projecting and partitioning is repeated for all the new sub-partitions which are of a smaller cardinality using a new projection line at each level. It can stop at any time as soon as the number of data signatures in a sub-partition reaches a specified lower limit which is less than or equal to one access in the data store. When a branch stops, the following steps are performed:
 1. The line used for projecting this sub-partition is stored in the parent node.
 2. A leaf partition is appended to the data file, containing the data signature identifiers of the sub-partition ordered by their rank along the projection line of the leaf node.
 3. The location in the data file, where this sub-partition was saved, is stored in the parent node.

Overall, an NV-tree consists of: a) a hierarchy of small inner nodes, which are kept in memory during query processing and guide the data signature search to the appropriate leaf node; and b) leaf nodes, which are stored on a data store and contain the references (data signature identifiers) to the actual data signatures.

NV-Tree Search

During query processing, the query data signature first traverses the intermediate nodes of the NV-tree. At each level of the tree, the query data signature is projected to the projection line associated with the current node.

In case of overlapping partitions the search is directed to the sub-partition with center-point closest to the projection of the query data signature, otherwise it follows into the partition the projection is assigned to. This process of projection and choosing the right sub-partition is repeated until the search reaches a leaf partition.

The leaf partition is then read from the data store and the query data signature is projected onto the projection line of the leaf partition. Then the search returns the data signature identifiers which are closest to that projection.

Note that since the leaf partitions have fixed size, the NV-tree guarantees query processing time of one data store read regardless of the size of the data signature collection. Larger collections need to do more projections and therefore deeper NV-trees, but still requiring just a single access to the data store.

The cost of the query processing consists of adding these 3 factors:
 The time it takes to traverse the NV-tree
 The time it takes to load the sub-partition from the data store
 The time it takes to aggregate the data signatures in the sub partition NV-Tree Data Structure The NV-Tree is composed of a hierarchy of small intermediate nodes that eventually point to much larger leaf nodes. Each intermediate node contains the following four arrays:
 Child: This array points to the child nodes of the intermediate node. The child nodes may in turn be intermediate nodes or leaf nodes.
 ProjectionLine: This array stores a pointer to the description of the projection line of each sub-partition.
 PartitionBorder: This array keeps track of the borders of each partition (including the overlapping partitions if applicable).
 SearchBorder (optionally): This array keeps track of the half-way values of projections between the boundaries of adjacent partitions. In case of overlapping partitions these values are used to direct the search to the sub-partition with center-point closest to the projection of the query data signature.

All leaf nodes are stored on a large data store and each leaf node is at most the size of a single data store read. The leaf nodes on the data store contain an array of data signature identifiers sorted by their projected value.

Partitioning Strategies

A partitioning strategy is likewise needed at every level of the NV-tree.

The Balanced partition strategy partitions data based on cardinality. Therefore, each sub-partition gets the same number of data signatures, and eventually all leaf partitions are of the same size. Although node fan-out may vary from one level to the other, the NV-tree becomes balanced as each leaf node is at the same height in the tree.

The Unbalanced partitioning strategy uses distances instead of cardinalities. In this case, sub-partitions are created such that the absolute distance between their boundaries is equal. All the data signatures in each interval belong to the associated sub-partition. With this strategy the projections leads to a significant variation in the cardinalities of sub-partitions. To implement the Unbalanced strategy, the standard deviation $s_d$ and mean m of the projections along the projection line are calculated. Then a parameter α is used to determine the partition borders as . . . , $m-2\alpha s_d$, $m-\alpha s_d$, m, $m+\alpha s_d$, $m+2\alpha s_d$, . . . .

Both strategies can be partitioned into up to 100 sub-partitions on each line, which tends to produce shallow and wide NV-Trees, while partitioning in very few (2-10) partitions per line yields deep and narrow trees.

Furthermore both strategies can flexibly interleave each other, talking thereby of a hybrid NV-Tree.

Overlapping is an additional feature that may be applied flexibly for any node and for both partitioning strategies. It creates additional partitions covering the area around the partition borders.

Insertion and Deletion

Inserting or deleting a data signature from the NV-tree is performed according to the following process:
 1. Traverse the NV-tree to identify (all) the partition(s) in the data file where the data signature is located. In case of overlapping partitions, the data signature may be saved in several partitions.
 2. Update the data signature in the partition(s).

In the case when a partition is full, i.e. once a new item has been added it will take more than one data read access to retrieve the partition, it needs to be split to accommodate more values. All data signatures in the partition are partitioned into sub-partitions, each sub-partition projected and then appended to the data file. Additionally the reference to the old sub-partition on disk is replaced with a reference to a new node in the NV-tree, which references the newly created sub-partitions.

In the case the number of data signatures in a partition x drops below a certain threshold (usually a small fraction of the leaf node's total storage capacity) it has to be merged with its sibling leaf nodes and when some siblings are inner nodes also with the children of those inner nodes. All data signatures of the current node and its siblings are loaded from the data store, a best line for the whole set is found and if the set does not fit within a single leaf node it is again split into sub-partitions. Afterwards the parent node of x is reorganized or replaced and all old leaf nodes marked as obsolete.

In the case that the siblings of a leaf node to be merged are together ancestors of more than 15-100 other leaf nodes, the merge step might refrain from re-indexing this whole large sub-tree, but instead distributing the remaining signatures in that leaf node among the children of a neighboring partition.

Aggregating Results of Several NV-Trees

Efficient and effective search of contrast filtered nearest neighbors might be improved by using more than one single NV-Tree. These result sets might be simply merged with a naive aggregation algorithm (successively popping off the highest ranked identifier from each result list) or might take into account in how many result sets a data signature is found, which implicit a higher ranking in the final result.

DETAIL DESCRIPTION OF THE DRAWINGS

Referring to FIG. 1, showing a sample NV-Tree. 101 shows the inner structure of the tree, while 102 refers to the layout on the data store. 103 shows a sample NV-Tree inner node containing a total of four storage fields, three of them are mandatory. In case overlapping is applied 104 refers to the PartitionBorder-Array and 105 to SearchBorder-Array keeping track of the half-way values of projections for searching in overlapping NV-Trees. In case of non-overlapping NV-Trees 104 is empty or non-existent, while 105 combines the functionality of the PartitionBorder and the SearchBorder-Array, because PartitionBorders are also used for guiding the search. Referring to 106 a reference to a line is stored with every reference to a child node 107. Child nodes can either be another NV-Tree inner node as 103 or a NV-Tree leaf node on the data store 108.

Figure 2:
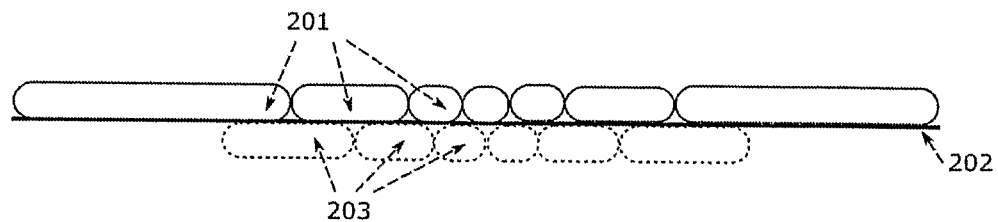
FIG. 2. shows a partition containing a fixed number of data signatures in its sub partitions.

Referring to FIG. 2, showing a balanced partitioning strategy. The data signatures projected onto line 202 are partitioned into partitions 201 of equal cardinality (expressed by the same height of the partitions 201). Since the projected data signatures on the line are expected to be normal distributed the absolute width of a partition on the line is much larger at the extremes. Additionally to the base partitions in 201, overlapping partitions 203 might be added.

Figure 3:
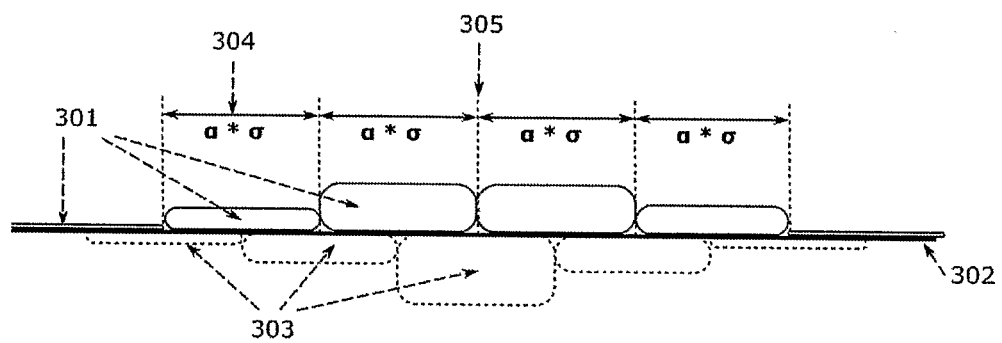
FIG. 3. shows a partition containing a variable number of data signatures in its sub partitions.

Referring to FIG. 3, showing an unbalanced partitioning strategy. The data signatures projected onto line 302 are partitioned into partitions 301 of equal width 304 on the line. The width along the line is best to be determined by a fixed multiple of the standard deviation 304, partitioning starting from the median 305. The number of data signatures inside the individual partitions 301 may vary significantly in size, since the projected data signatures are expected to be normal distributed. Also in this case overlapping partitions 303 may be added.

Figure 4:
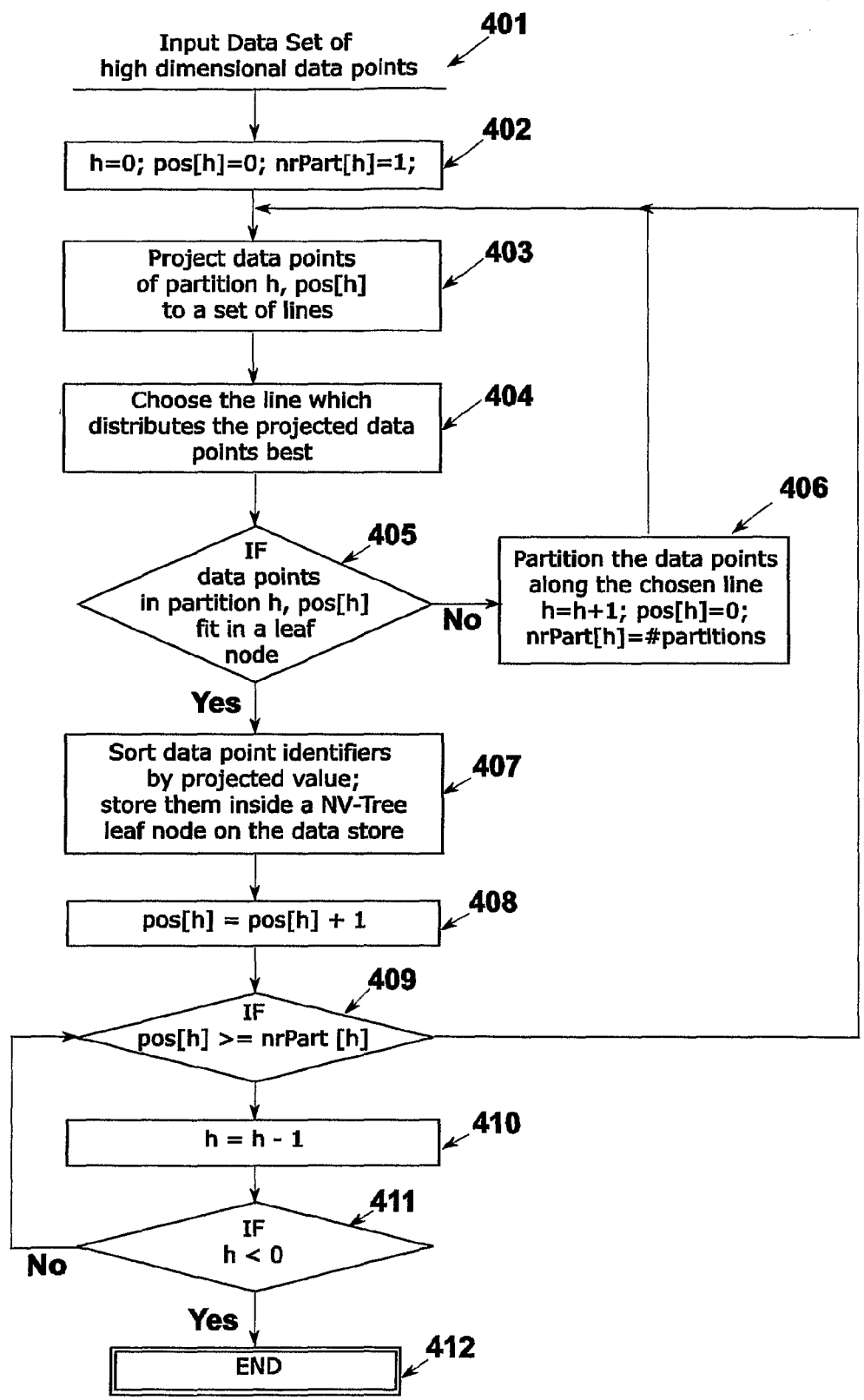
FIG. 4. shows a flow-diagram illustrating the steps for creating a NV-Tree from a collection of data signatures FIG. 5. shows a flow-diagram illustrating the steps for searching a query data signature in an existing NV-Tree FIG. 6. shows a flow-diagram illustrating the steps for inserting a query data signature in an existing NV-Tree FIG. 7. shows a flow-diagram illustrating the steps for deleting a query data signature from an existing NV-Tree

Referring to FIG. 4, showing the steps for creating a NV-Tree from a collection of data signatures 401. The process starts by initializing data structures that keep track of the current path down the NV-tree 402 during the creation process. The variable h denotes the current height, pos[h] denotes the current partition at height h and nrPart[h] denotes the number of partitions at height h. The data signatures in partition pos[h] at height h are projected to a set of lines 403. The line which distributes the projected data best is then selected 404. As shown in 405, If the data signatures in partition pos[h] at height h do not fit in a leaf node, then we partition the data signatures along the chosen line 406 and set h=h+1, pos[h]=0, nrPart[h]=#Number of Partitions and step back to 403. When the data signatures in partition pos[h] at height h fit in a leaf node then the data signature identifiers are sorted by their projected value and stored on the data store 407. We now turn to the next partition in the node, so we set pos[h]=pos[h]+1 408. As shown in 409. if pos[h] is equal or less than nrPart[h] we step back to 3 and process the data signatures in the next partitions, else if pos[h]>nrPart[h] then we have stored all the data signatures on this partition to data store, and may step up the tree 410, by setting h=h−1. As shown in 411, if h<1 then we are stepping up from the root node, which marks the end of the index creation 412, else we step back to 409.

Figure 5:
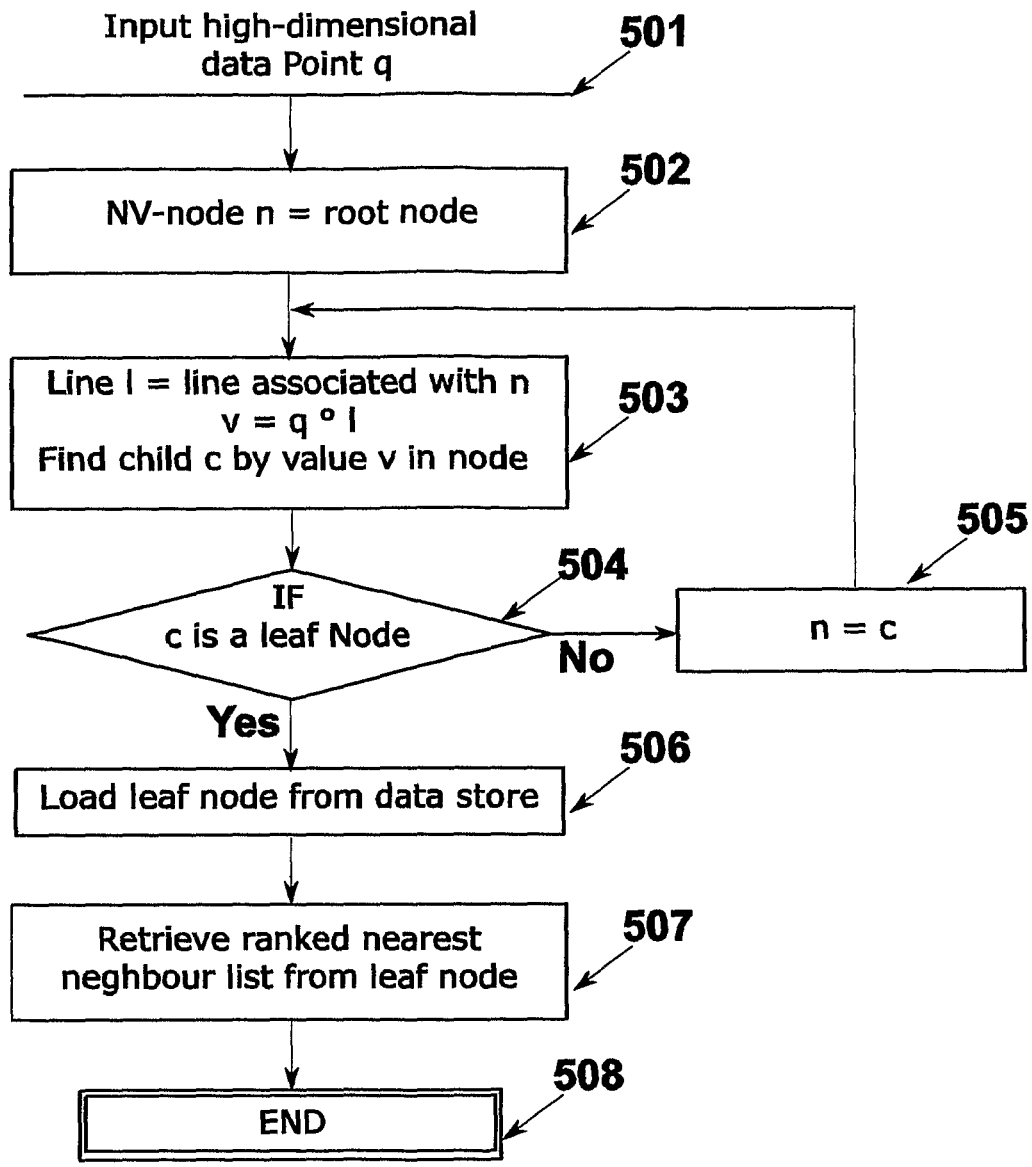

Referring to FIG. 5, showing the steps for searching a NV-tree for a query data signature q 501. The process involves first setting n to be the root node of the NV-tree 502. We now start traversing down the NV-tree until c is a leaf node. This is done by selecting line l associated with the current node n and projecting q to line l to get the projected value v. Using v, we can find a child c in which is closest to v. Then we set l to be the line associated with c 503. If c is not a leaf node, 504, then we set n=c 505 and step back to 503. When node c is a leaf node, it is loaded from the data store 506 and the ranked nearest neighbor list is retrieved from c 507, ending the search 508.

Figure 6:
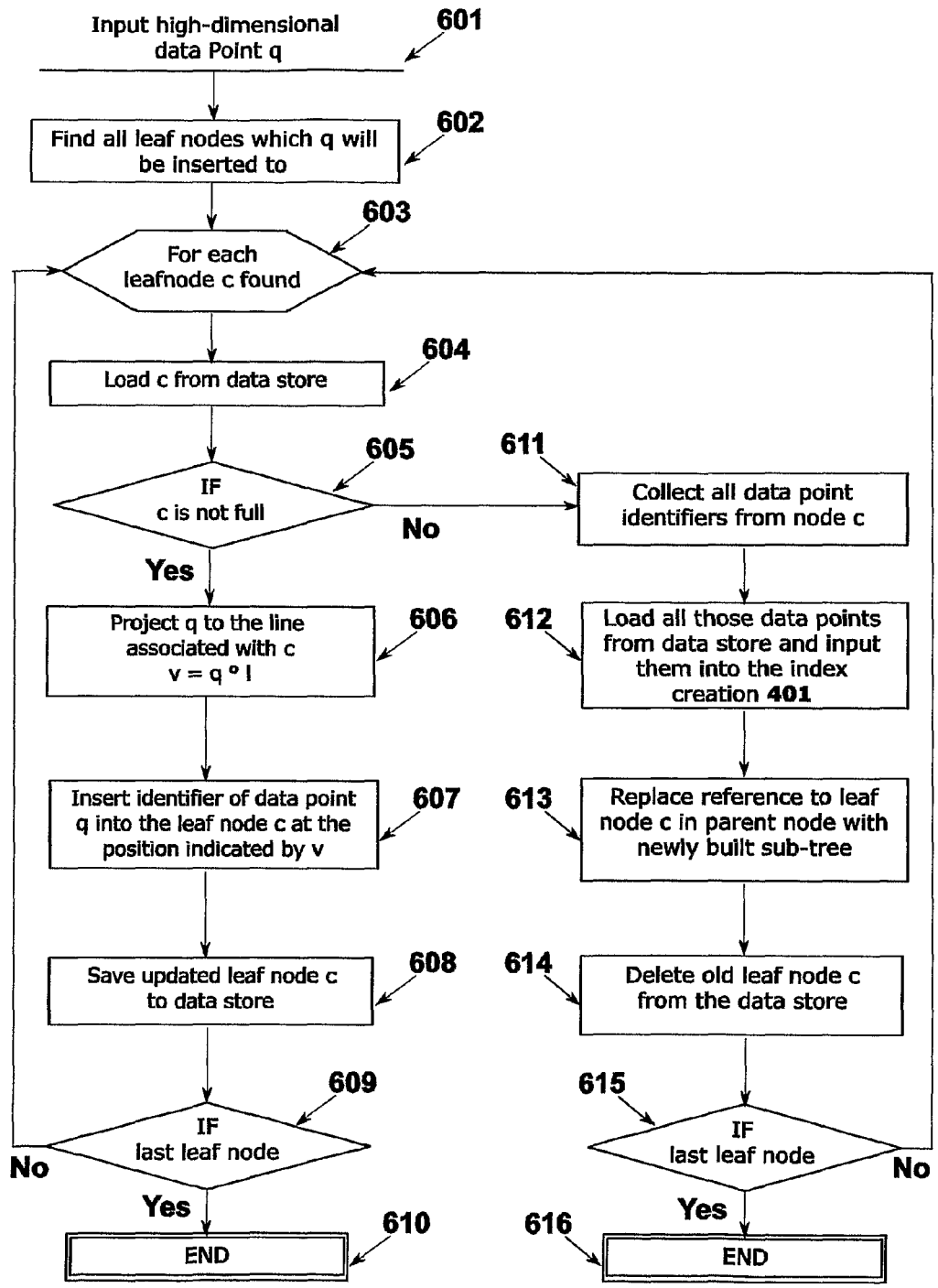

Referring to FIG. 6, showing the steps for inserting into a NV-tree a query point q 601. The process involves first finding all leaf nodes in which the data signature will be inserted into 602. in case of overlapping segments there can be several. In case of non-overlapping segments, a point q is always inserted into just one leaf node 602. Then, for each leaf node c 603 we load c from data store 604. If c has room for another identifier 605, then we project q to the line associated with c 606 to get the projected value v and insert the identifier 607 of data signature q into c at the position indicated by v. The leaf node c is then updated and saved to the data store 608. If c was the last leaf node 609 found in 602, then we end the insertion 610, otherwise we step back to 603. Turning back to the case c is full 605, we need to find all identifiers in c 611, load the corresponding data signatures from data store 612 and input them to the index creation from 101. The steps in 101 will create a new sub-tree pointing to new leaf nodes in the data store. The parent of c which has up to now pointed to c, is now updated to point to this new subtree 613. The old leaf node c, is now deleted 614 by marking it as free, making the now empty space available for new leaf nodes created in further splits. If c was the last leaf node 615 found in 602, we end the insertion 616, else we step back to 603.

Figure 7:
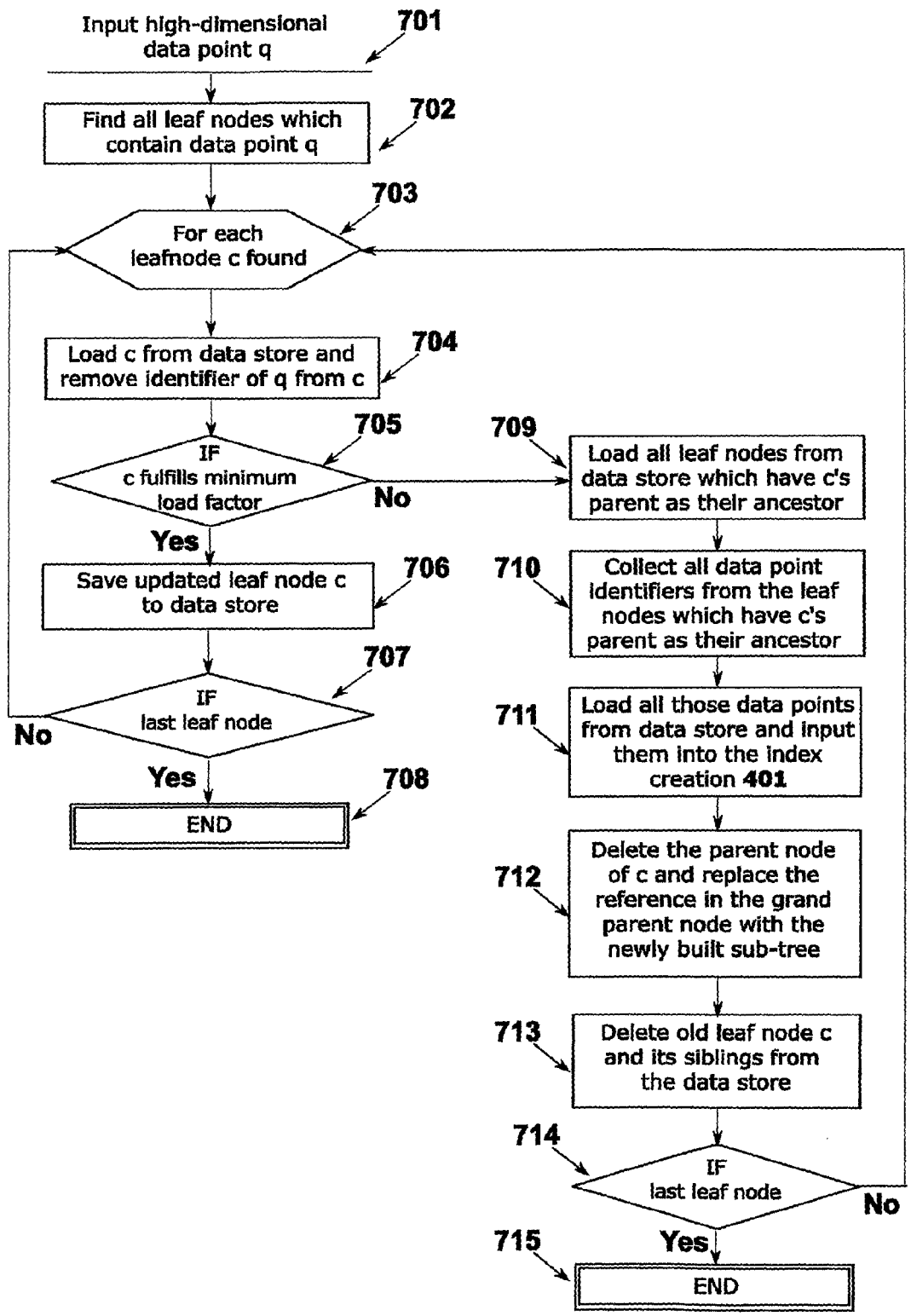

Referring to FIG. 7, showing the steps for deleting data signature q from the NV-tree 701. The process involves first finding all leaf nodes containing q 702. In case of overlapping segments they can be many. In case of non-overlapping segments, only a single leaf node contains q 702. Then, for each leaf node c 703 we load c from data store and remove the identifier of q from the c 704. If c fulfills the minimum load factor 705, then c is updated and saved to data store 706. If c was the last leaf node 707 found in 702, then we end the deletion 708, otherwise we step back to 703. Turning back to the case c does not fulfill the minimum load factor 705, we need to load all leaf nodes from data store which have c's parent as their ancestor 709. All identifiers are retrieved 710 from these leaf nodes, and their data signatures loaded from data store 711. The data signatures are then input into the index creation from 101. The steps in 101 will create a new sub-tree pointing to new leaf nodes in the data store. The reference in the grand-parent of c is now replaced with this new sub-tree 712, and the parent of c is deleted. Then c, along with all its siblings is deleted 713 from data store by marking them as free for new leaf nodes when the tree is extended again during a split. If c was the last leaf node 714 found in 702, then we end the deletion 715, otherwise we step back to 703.

Pseudo Code for One Preferred Embodiment
Pseudocode NV-tree
TreeCreation:

```
procedure TreeCreation(data signature set D)
{
    Line = new Line(D) through the metric space
    TreeCreationRecursive( D, Line )
}
procedure TreeCreationRecursive(data signature set D, line n)
{
    Take the set D of data signatures and project all data signatures d1...dn onto line n in
the
```

```
    same metric space
    Examine the distribution of the data along this line, cut the line into x pieces and classify
the data signatures of
    set D into x subsets D1..Dx according to which partition they have been projected to.
    Build additional x-1 (overlapping) subsets around the cut points on the line (as shown in
figure Figure 2 and Figure 3)
    Save the line of the partition to the NV -tree Save the borders of all sub-partitions
to the NV -tree Save the quantiles search border values of all sub-partitions to the NV -
tree
    for 1 <= i <= 2x-1 check
    {
        if (partition(i).size < IO.granularity on the data store)
        {
            write a flag to Tree-File indicating we stop recursion
            append Partition to data file
        }
        else
        {
            write a flag to Tree-File indicating we go on
            Line = new Line(partition(i)) through the metric space
            TreeCreationRecursive(partition(i),Line)
        }
    }
}
```

Search:

```
procedure Search(data signature x)
{
    node = root of the NV -tree
    while (true)
    {
        pVal = project x to the line associated with node
        Partition p = the sub-partition in node directed by the search
        border values
        if p stored on data store
            break the loop;
        else
            node = node->Child(p)
    }
    Partition res = load partition p from data store
    pVal = project x to the line associated with res
    Aggregate res, starting from pVal
}
```

HelperFunction:

```
procedure LocatePartitions(Data signature x, Node* currNode, pVal, list l)
{
    if pVal < leftmost border in currNode
        Partition p = leftmost Partition in currNode
        if( p is leaf)
            l.add( pVal, p.id )
        else
            pVal = project x to the line associated with currNode
            LocatePartitions( x, p, pVal, l )
    else if pVal > rightmost border in currNode
        Partition p = rightmost Partition in currNode
        if( p is leaf)
            l.add( pVal, p.id )
        else
            pVal = project x to the line associated with currNode
            LocatePartitions( x, p, pVal, l )
    else
        offset = the leftmost border in currNode where pVal is bigger
        Partition p1 = currNode.Partition(offset)
        Partition p2 = currNode.Partition(offset+1)
        pVal1 = project x to the line associated with p1
        pVal2 = project x to the line associated with p2
        if p1 is leaf
            l.add( pVal1, p1.id )
        else
            LocatePartitions( x, p1, pVal1, l )
```

```
        if p2 is leaf
            l.add( pVal2, p2.id )
        else
            LocatePartitions( x, p2, pVal2, l )
}
```

Insert:

```
procedure Insert(data signature x)
{
    Node = root of the NV -tree
    pVal = project x to the line associated with Node
    List l = LocatePartitions( x, Node, pVal, new List )
    descID = x.id;
    for 1 <= j <= l.size( )
    {
        pVal = l[j].pVal;
        PartitionID = l[j].PartitionID
        if partitions is full
            split the partition and update the NV -tree
        write the descID/pVal pair to Partition=PartitionID in the data file
    }
}
```

Delete:

```
procedure Delete(data signature x)
{
    Node = root of the NV -tree
    pVal = project x to the line associated with Node
    List l = new empty List;
    LocatePartitions( x, Node, pVal, l )
    descID = x.id;
    for 1 <= j <= l.size( )
    {
        pVal = l[j].pVal;
        PartitionID = l[j].PartitionID
        delete the descID/pVal pair from Partition=PartitionID in the data file
    }
}
```

The implementations of the invention being described can obviously be varied in many ways. Such variations are not to be regarded as a departure from the spirit and scope of the present invention, and all such modifications as would be obvious to one skilled in the art are intended to be included within the scope of the following claims.

Comparative Performance Results

The nearest neighbor search capability of the NV-tree has been compared to its closest competitors: Locality Sensitive Hashing and the PvS-Index. High emphasis was laid on a fair choice of the parameters, the factor a of the NV-Tree versus radius and word size of LSH.

For the experiments a collection of 179.4 million SIFT (Scale Invariant Feature Transform) data signatures was used, extracted from an archive of about 150 000 high-quality press photos. In order to evaluate the retrieval quality of the different high-dimensional index structures, several transformed versions of images from the collection were created. The transformations include rotation, cropping, affine distortions and convolution filters.

The inner product in Euclidean space was chosen as a commonly used projection function. It has to be noted, however, that the NV-Tree has also been evaluated with L1 and L2-distance as projection function. Out of these transformed images, a set of 500 000 query data signatures were created which were evaluated in the following four different setups:

One overlapping hybrid NV-Tree ($\alpha=0.55$) (unbalanced partitioning on the upper hierarchies, balanced partition on the lower hierarchies) with naïve leaf node organization (array)

One overlapping hybrid NV-Tree ($\alpha=0.55$) with optimized leaf node organization 3 non-overlapping hybrid NV-Trees ($\alpha=0.75$) with naïve aggregation 12 LSH hash tables with radius of 65 and a word size of 10 with naive aggregation All three NV-Tree setups constantly returned a result set of 1000 nearest neighbor candidates, guaranteeing good result quality as can be seen from Table 1. For LSH no guarantee can be given on how many neighbors are retrieved. With the chosen setup it yielded a minimum of 47 neighbors and a maximum of 156 256 with a median of 465.

Preliminary studies performed on this and other large data signature collections have shown that the definition of a nearest neighbors search is just meaningful in the context of contrast filtered nearest neighbor search. This can be theoretically justified by the results published in Beyer et. al "When is nearest neighbor meaningful" in Lecture Notes in Computer Science 1540:217-235, 1999 showing that a nearest neighbor must be significantly closer to a query point than most of the other points in the dataset in order to be considered meaningful. A contrast based definition of nearest neighbors approximates also the human notion of neighbors best. While in sparsely populated areas (as in the countryside) neighbors can be several kilometers of absolute distance away from each other, while in densely populated areas (as in cities) absolute distance between neighbors is just a few meters.

In the presented experiment the contrast ratio is defined by $d(n_{100}, q)/d(n_i, q) > 1.8$, where $n_{100}$ refers to the hundredth nearest neighbor of an exact nearest neighbor search as retrieved by a linear scan. Evaluating this definition on the 500 000 query data signatures a total of 248,212 data signatures surpass the contrast filter.

With only one data store access the overlapping NV-Tree performs best in terms of search time and receives still acceptable recall performance. Major drawback is the huge demand on disk space. This can be slightly reduced by using the whole bandwidth of a single disk access (32 4 kb-pages instead of 6 4 kb-pages for the given experimental setup) and avoiding one level of overlapping. In order to achieve the same retrieval quality the leaf node was structured by itself as a small tree containing another two levels of non-overlapping projections and finally a sorted array of identifiers, where up to 4 such arrays were touched during the aggregation.

The space requirement can be reduced significantly by removing the overlapping. Non-overlapping NV-Trees do not deliver as good result quality; therefore it needs an aggregation of at least 3 trees to get acceptable recall. In order to achieve comparable recall quality LSH needs at least 12 hash tables, which cause at least 12 (one per hash table and possibly more) accesses to the data store.

Although the recall for the experiments presented is very high for searching such a huge collection, the results are lacking on precision. While such low precision is well acceptable in local data signature applications, where many data signatures "vote" on the similarity of an object, this is unacceptable for user-orientated single data signature applications, since a user can only scan a handful of results and not several hundreds.

In order to increase such precision, returning now at most 8 nearest neighbor candidates, we need to add more index structures and perform a more sophisticated aggregation on the results:

6 non-overlapping hybrid NV-Trees ($\alpha=0.75$) with rank aggregation and a minimum limit of 2 votes 24 LSH hash tables with radius of 80 and a word size of 12 and vote count aggregation A PvS-Framework consisting of 3 different indices using a 13-13-13-13-13 segmentation with rank aggregation and a minimum limit of 2 votes

TABLE 1

|  | Creation Time | Size on Data Store | Accesses to Data Store | Recall (Search quality) |
|---|---|---|---|---|
| 1 Overlapping hybrid NV-Tree (naive leaf node organisation) | ~16 h | ~50 GB | 1 | 65.8% |
| 1 Overlapping hybrid NV-Tree (opt. leaf node organisation) | ~20 h | ~33 GB | 1 | 68.3% |
| 3 non-overlapping hybrid NV-Trees (naive aggregation) | ~6 h | ~3 GB | 3 | 73.5% |
| 12 LSH hashtables radius = 65, word size = 10 | Not measured | ~24 GB | >=12 | 72.9% |

TABLE 2

|  | Creation Time | Size on Data Store | Accesses to Data Store | Recall (Search quality) |
|---|---|---|---|---|
| 6 non-overlapping hybrid NV-Trees (rank aggregation) | ~12 h | ~6 GB | 6 | 69.1% |
| 24 LSH hashtables radius = 65, word size = 10 | Not measured | ~48 GB | >=24 | 65.2% |
| PvS-framework with 3 indices 5 × 13 segmentation | Not measured | ~136 GB | 3 | 52.0% |

The results in table 2 show that the NV-Tree configuration clearly out beats LSH in terms of disk space and search speed for obtaining a comparable amount of recall quality and precision. The PvS-Framework suffers from its huge storage demand on the data store together with a rather low recall when only using 3 indices.

Industrial Applicability

The NV-tree is a general data structure for high dimensional nearest neighbor search. It supports any kind of data dimensionality and multiple distance measures, and is applicable for at least the following applications:

Searching multimedia on the Web
Image retrieval
Image copyright monitoring
Music retrieval
Music copyright monitoring
Video retrieval
Video copyright monitoring
General multimedia retrieval
Object and face retrieval and detection
Robotic Vision
Combined text and multimedia retrieval
Searching chemical structures and biological structure (e. proteins)
Searching DNA sequences and in fact, in any data mining application were data can be represented with data signatures.

The invention claimed is:

1. A method implemented in a processor for creating a nearest vector search tree for data mining with constant search time, said method comprising the steps of:
   a) generating a set of isotropic random lines and store said lines in a line pool,
   b) projecting data signatures onto a line from said pool,
   c) building a tree node storing information characterizing said line,
   d) segment said line into two or more line partitions,
   e) segment further said two or more line partitions from step d),
   f) repeat steps b-e using a line partition from step (e) as the line in step (b) until a stop value is reached, said stop value being reached when the number of data signatures in a sub-partition reaches a specified lower limit which is less than or equal to one access in the data store,
   g) project a subset data signatures from step (e) of partition to a line,
   h) sort said data signatures, store said data signatures consecutively in a data storage,
   wherein a best line is selected, said projection line having the largest projection variance, and by repeating the process of projecting and partitioning, data is eventually separated into small partitions, requiring only one data store access per query data signature.

2. The method for inserting data signatures into a search tree of claim 1, said method comprising the steps of:
   a) traversing said search tree,
   b) projecting data signatures representing said data to be inserted onto a projection line,
   c) select one or more path based on a projection value obtained in step b,
   d) repeat steps a-c until said data signature is projected to a value belonging to a partition stored in said data store,
   e) searching for location in pre-sorted data signatures of said partition,
   f) store said data signature.

3. The method for deleting data signature from a search tree of claim 1, said method comprising the steps of:
   a) traversing said search tree,
   b) projecting data signatures, representing said data signatures to be deleted, onto a projection line,
   c) selecting one or more path based on a projection value obtained in step b,
   d) repeat steps a-c until said data signature is projected to a value belonging to a partition stored in said data store,
   e) searching for location in pre-sorted data signatures of said partition,
   f) delete said data signature.

4. The method for data mining a search tree with constant search time of claim 1, said method comprising the steps of:
   a) traversing a search tree to a leaf,
   b) retrieving one or more data signature from said leaf,
   c) read data pointed to by said data signature,
   d) locating one or more value in said data, referencing one or more data signature,
   e) retrieve the n-nearest data signature neighbors,
   f) terminate said search.

5. A computer program or suite of computer programs so arranged such that when executed on a processor said program or suite of programs cause(s) said processor to perform a method for creating a nearest vector search tree for data mining with constant search time, said method comprising the steps of:
   a) generating a set of isotropic random lines and store said lines in a line pool,
   b) projecting data signatures onto line from said pool,
   c) building a tree node storing information characterizing said line,
   d) segment said line into two or more line partitions,
   e) segment further said two or more line partitions from step d),
   f) repeat steps b-e using a line partition from step (e) as the line in step (b), until a stop value is reached, said stop value being reached when the number of data signatures in a sub-partition reaches a specified lower limit which is less than or equal to one access in the data store,
   g) project a subset data signatures from step (e) of partition to a line, h) sort said data signatures, store said data signatures consecutively in a data storage, wherein a best line is selected, said projection line having the largest section variance, and by repeating the process of projecting and partitioning, data is eventually separated into small partitions, requiring only one data store access per query data signature.

6. A computer readable non-transitory data storage medium storing a computer program or at least one of a suite of computer programs so arranged such that when executed on a processor said program or suite of programs cause(s) said processor to perform a method for creating a nearest vector search tree for data mining with constant search time, said method comprising the steps of:
   a) generating a set of isotropic random lines and store said lines in a line pool,
   b) projecting data signatures onto line from said pool,
   c) building a tree node storing information characterizing said line,
   d) segment said line into two or more line partitions,
   e) segment further said two or more line partitions from step d),
   f) repeat steps b-e using a line partition from step (e) as the line in step (b), until a stop value is reached, said stop value being reached when the number of data signatures in a sub-partition reaches a specified lower limit which is less than or equal to one access in the data store,
   g) project a subset data signatures from step (e) of partition to a line,
   h) sort said data signatures, store said data signatures consecutively in a data storage,
   wherein a best line is selected, said projection line having the largest projection variance, and by repeating the process of projecting and partitioning, data is eventually separated into small partitions, requiring only one data store access per query data signature.

7. The method according to claim 1, wherein the segmentation in steps d and e are non-overlapping segmentations.

* * * * *